US008427995B2

(12) United States Patent
Song et al.

(10) Patent No.: US 8,427,995 B2
(45) Date of Patent: Apr. 23, 2013

(54) REDUCING AN OCCURRENCE OF FALSE GRANTS FOR A MULTICAST SESSION WITHIN A WIRELESS COMMUNICATIONS NETWORK

(75) Inventors: Bongyong Song, San Diego, CA (US); Kruthika Ponnusamy, San Diego, CA (US); Harleen Gill, San Diego, CA (US); Arvind Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 945 days.

(21) Appl. No.: 12/212,966

(22) Filed: Sep. 18, 2008

(65) Prior Publication Data

US 2009/0080360 A1 Mar. 26, 2009

Related U.S. Application Data

(60) Provisional application No. 60/974,805, filed on Sep. 24, 2007.

(51) Int. Cl.
*H04H 20/71* (2008.01)

(52) U.S. Cl.
USPC ............ 370/312; 370/235; 370/236; 370/432

(58) Field of Classification Search .................. 370/229, 370/230, 231, 235, 236, 236.1, 310, 312, 370/328, 329, 431, 432
See application file for complete search history.

(56) References Cited

U.S. PATENT DOCUMENTS

| 6,965,580 | B1 * | 11/2005 | Takagi et al. ................. 370/312 |
| 7,580,669 | B2 * | 8/2009 | Yahagi .......................... 455/3.01 |
| 2004/0162071 | A1 | 8/2004 | Grilli et al. |
| 2005/0111393 | A1 * | 5/2005 | Jeong et al. ................... 370/312 |
| 2007/0047545 | A1 * | 3/2007 | Bou-Diab et al. ............. 370/390 |
| 2007/0049314 | A1 * | 3/2007 | Balachandran et al. ...... 455/518 |
| 2007/0081459 | A1 * | 4/2007 | Segel et al. .................... 370/230 |
| 2007/0192439 | A1 | 8/2007 | Bhaskaran |
| 2011/0206020 | A1 * | 8/2011 | Hollick et al. ................ 370/337 |

FOREIGN PATENT DOCUMENTS

| JP | 2005117655 A | 4/2005 |
| JP | 2006512878 A | 4/2006 |

OTHER PUBLICATIONS

J. Wang et al: "broadcast and Multicast Services n cdma2000" IEEE Communications Magazine, Feb. 2004, XP002516252.
International Search Report, PCT/US2008/077544: International Searching Authority; European Patent Office, Mar. 4, 2009.
Written Opinion, PCT/US2008/077544: International Searching Authority; European Patent Office, Mar. 4, 2009.
International Preliminary Report on Patentability, PCT/US2008/077544, International Bureau, The International Bureau of WIPO, Apr. 1, 2010.

* cited by examiner

*Primary Examiner* — Chi Pham
*Assistant Examiner* — Weibin Huang
(74) *Attorney, Agent, or Firm* — Raphael Freiwirth

(57) ABSTRACT

Aspects of reducing an occurrence of false grants for a multicast session within a wireless communications network are disclosed. For example, an access network receives an announce message to be transmitted to a plurality of access terminals, the received announce message configured to announce a given multicast session. The access network determines whether sufficient resources are available to support the given multicast session. The access network configures the received announce message to convey whether sufficient resources are available to support the given multicast session based on the determining step, and transmits the configured announce message to the plurality of access terminals. A given access terminal receives the announce message, and determines whether the received announce message indicates whether sufficient resources are available to support the given multicast session. The given access terminal sends an announce acknowledgment (ACK) message that indicates an acceptance or rejection of the given multicast session.

59 Claims, 5 Drawing Sheets

REDUCING AN OCCURRENCE OF FALSE GRANTS FOR A MULTICAST SESSION WITHIN A WIRELESS COMMUNICATIONS NETWORK

CLAIM OF PRIORITY UNDER 35 U.S.C. §119

The present Application for Patent claims priority to Provisional Application No. 60/974,805, entitled "METHODS OF REDUCING AN OCCURRENCE OF FALSE GRANTS FOR A MULTICAST SESSION WITHIN A WIRELESS COMMUNICATIONS NETWORK", filed Sep. 24, 2007, which is assigned to the assignee hereof and hereby expressly incorporated by reference herein in its entirety.

BACKGROUND OF THE INVENTION

1. Field of the Invention

The invention relates to communications in a wireless telecommunication system and, more particularly to methods of reducing an occurrence of false grants for a multicast session within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3$^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the invention are directed to systems and methods of reducing an occurrence of false grants for a multicast session within a wireless communications network. For example, an access network receives an announce message to be transmitted to a plurality of access terminals, the received announce message configured to announce a given multicast session. The access network determines whether sufficient resources are available to support the given multicast session. The access network configures the received announce message to convey whether sufficient resources are available to support the given multicast session based on the determining step, and transmits the configured announce message to the plurality of access terminals. A given access terminal receives the announce message, and determines whether the received announce message indicates whether sufficient resources are available to support the given multicast session. The given access terminal sends an announce acknowledgment (ACK) message that indicates an acceptance or rejection of the given multicast session, in response to the received announce message, based on the determining step.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
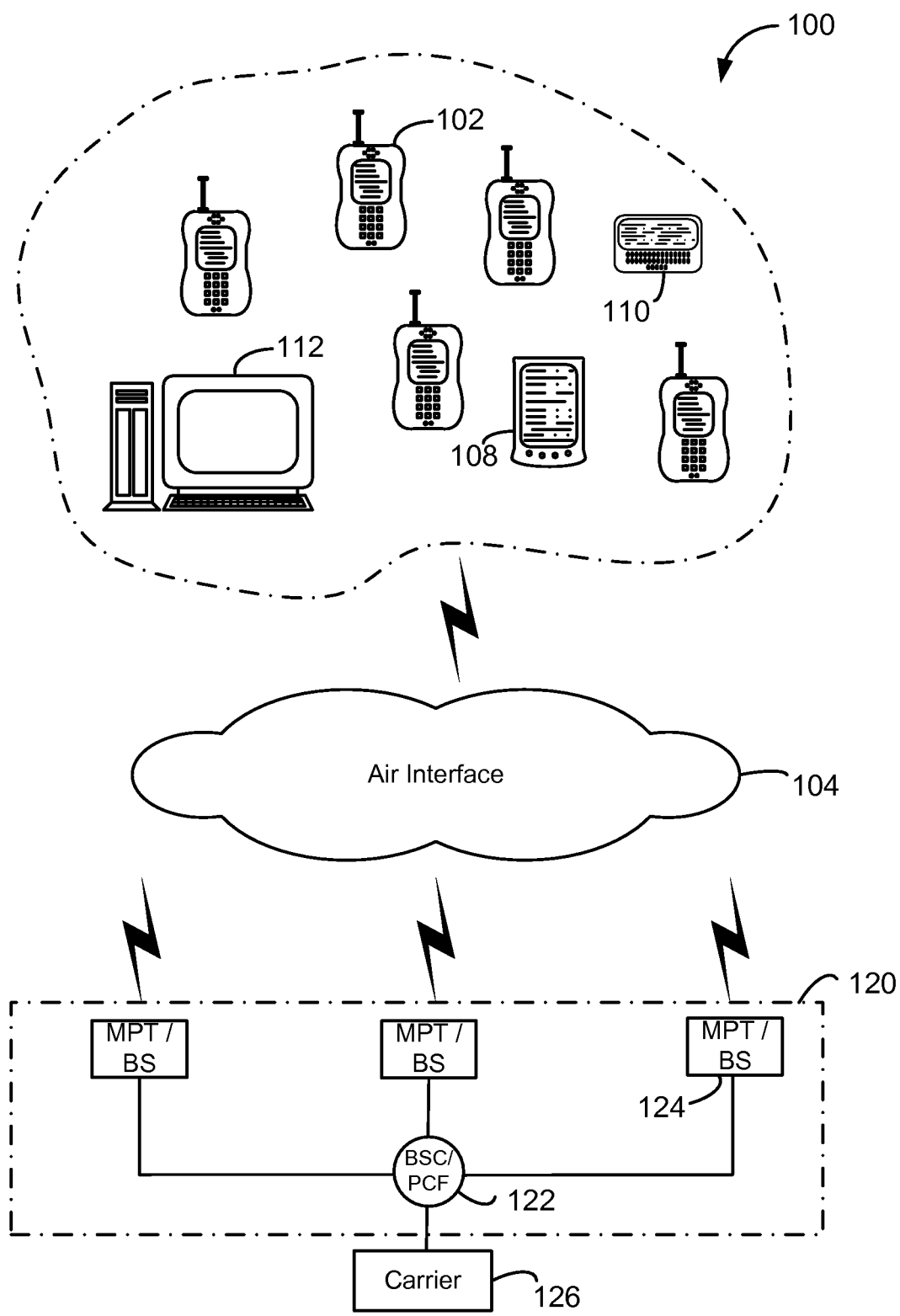
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless communication system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or subcombination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102,108,110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
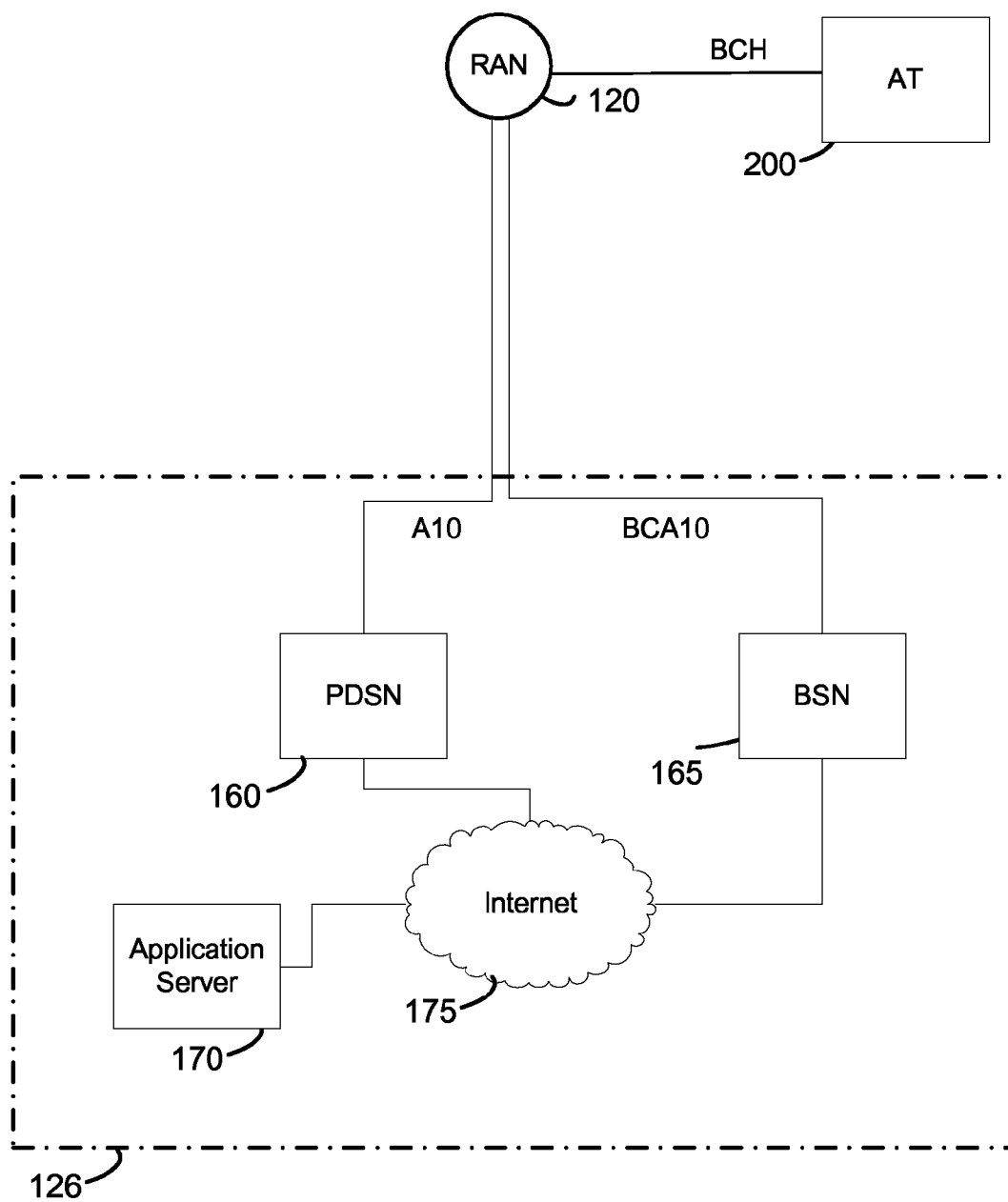
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
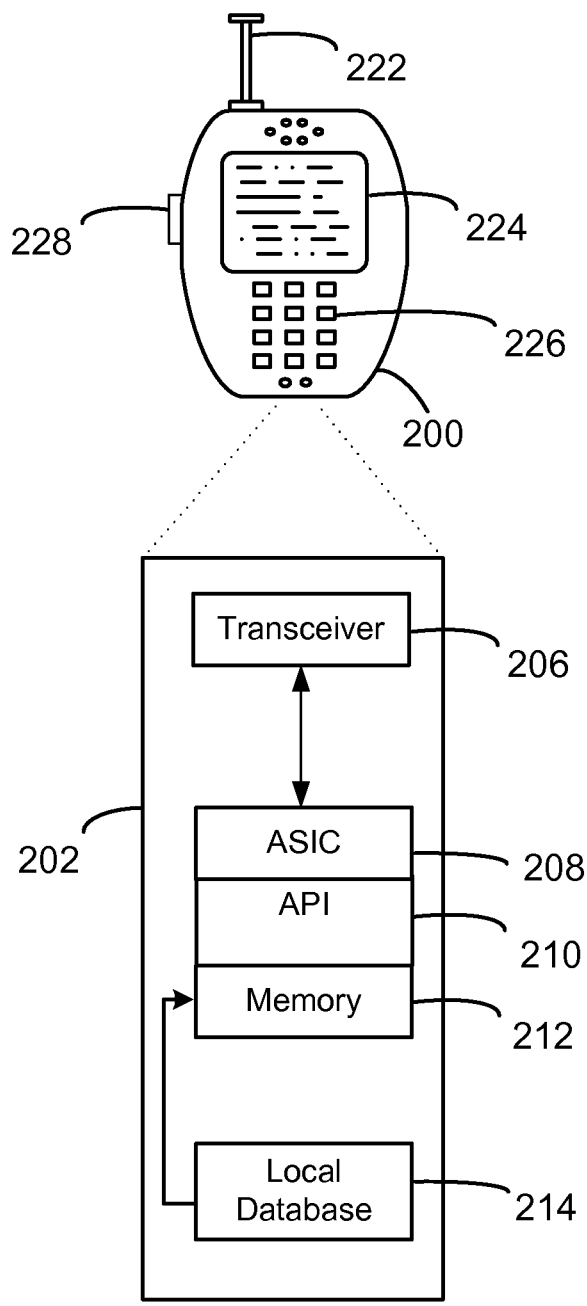
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
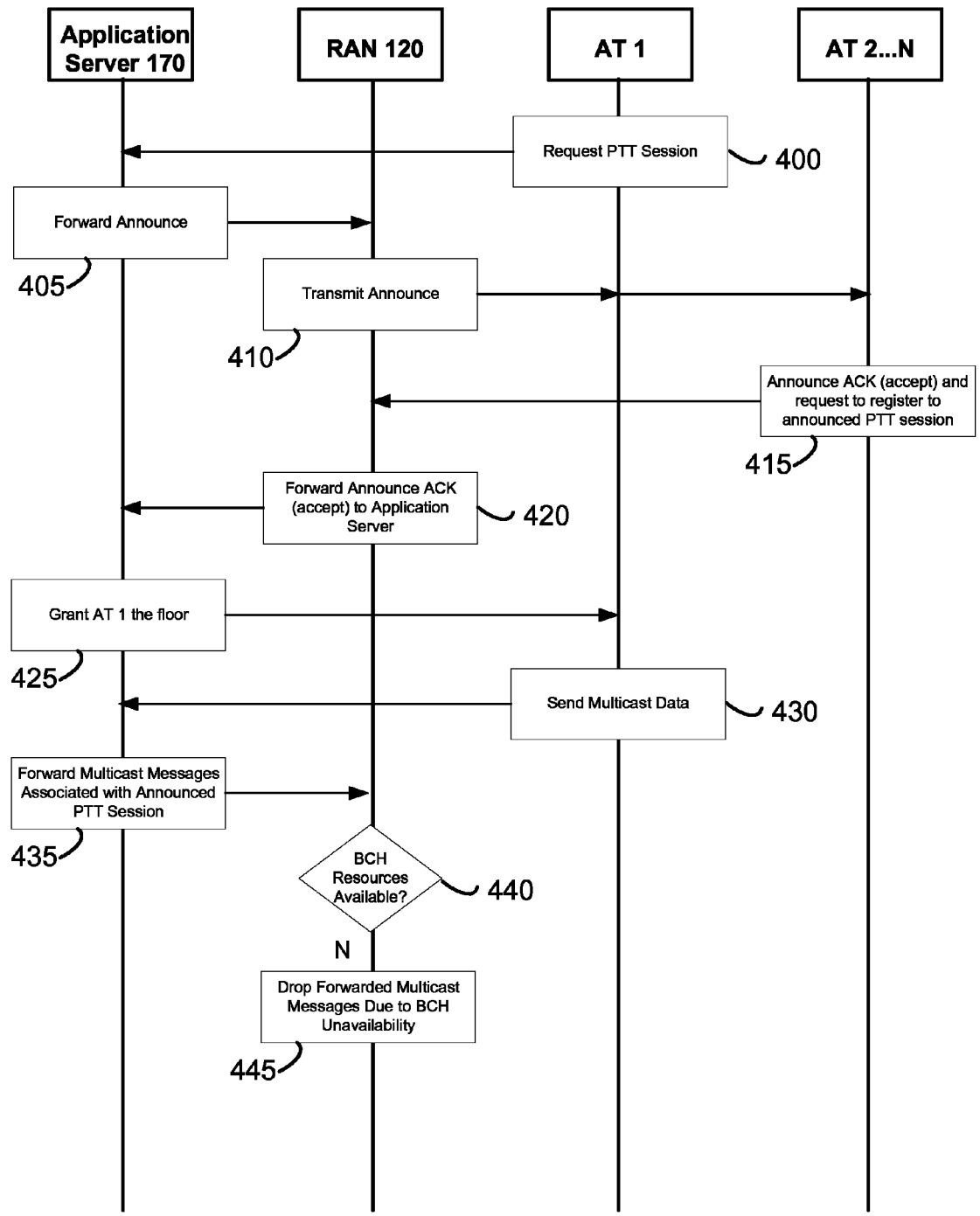
FIG. 4 illustrates a conventional multicast messaging process.

FIG. 4 illustrates a conventional multicast messaging process. In particular, FIG. 4 illustrates a conventional manner in which the floor is granted to an access terminal to begin a multicast session.

In 400, one of a plurality of access terminals ("AT 1") in communication with the RAN 120 ("PTT initiator") requests to initiate a PTT session, or multicast session. Accordingly, the PTT initiator sends a PTT call request to the application server 170 (e.g., a PTT server). Next, in 405, the application server 170 forwards an announce message to the RAN 120, and the RAN 120 transmits the announce message, 410, announcing the PTT session to each multicast group member for the PTT session. For example, the application server 170 forwards the announce message to the RAN 120 via the PDSN 160 and/or BSN 165, 405, and the RAN 120 transmits the announce message over the air interface 104 to a plurality of ATs 1 . . . N, 410. The announce message is transmitted in multiple sectors within the wireless communication system 100. ATs 1 . . . N may each be present within the same sector, or alternatively may be present within different sectors of the wireless communications system 100. Furthermore, the RAN 120 communicating with AT 1 and the RAN 120 communicating with ATs 2 . . . N may be different.

In 415, a given AT ("AT 2") among ATs 2 . . . N responds to the announce message by sending an announce acknowledgment (ACK) message on a reverse link access channel to the RAN 120. The announce ACK message may indicate either of an acceptance (i.e., indicating AT 2 is interested in the announced PTT session) or a rejection (i.e., indicating AT 2 is not interested in the announced PTT session) of the announced PTT session. For convenience of description, assume that the first responder AT 2 is interested in the announced PTT session and sends an announce ACK message indicating an acceptance to the RAN 120 in 415.

In 420, the RAN 120 forwards the announce ACK message to the application or PTT server 170. While not shown explicitly within FIG. 4, the announce ACK message is sent along with a BCMCSFlowRegistration message to register for the BCMCS flow associated with the announce message. The RAN 120 receives the BCMCSFlowRegistration message and adds AT A to a multicast group for the announced PTT session (not shown).

In 425, once the application server 170 receives a first announce ACK message indicating an acceptance of the announced PTT session (i.e., the announce ACK message sent in 420), the application server 170 sends the PTT initiator AT 1 a message granting AT 1 the floor. After AT 1 is granted the floor, the user of AT 1 can begin sending data (e.g., speaking, video streaming, text messaging, etc.) to one or more multicast group members that have registered for or are otherwise monitoring the announced PTT session. The multicast data (i.e., the spoken words or other audio/video, from 430) are received at the application server 170, and are forwarded to the RAN 120 for transmission on a downlink broadcast channel (BCH) within sectors containing or in proximity to sectors known/expected to contain one or more interested multicast group members.

In 440, before allocating resources on the downlink BCH for multicast message transmission associated with the announced PTT session, the RAN 120 determines, whether sufficient resources are actually available for allocation. In an example, this determination may be performed on a sector-by-sector basis.

In an example, assume that AT 2 is present within sector X, and sector X (e.g., and its adjacent sectors) do not have sufficient downlink BCH resources to handle the announced PTT session. Accordingly, the RAN determines, 440, that sufficient BCH resources are not available, and drops the forwarded multicast messages, 445.

As will be appreciated from the above description of the process of FIG. 4, the granting of the floor to the PTT initiator AT 1 when the PTT session cannot actually be handled by the RAN 120, referred to as a "false grant", wastes system resources, and can also cause frustrate the user of AT 1 because the user begins sending data (e.g., speaking) subsequent to being granted the floor only to later be informed that no one was actually "listening".

As discussed above, "falsely" granting a PTT initiator the floor when the RAN 120 cannot support the PTT session can waste system resources and cause an unsatisfactory user experience. Accordingly, embodiments of the present invention are directed to reducing the occurrence of false grants.

Figure 5:
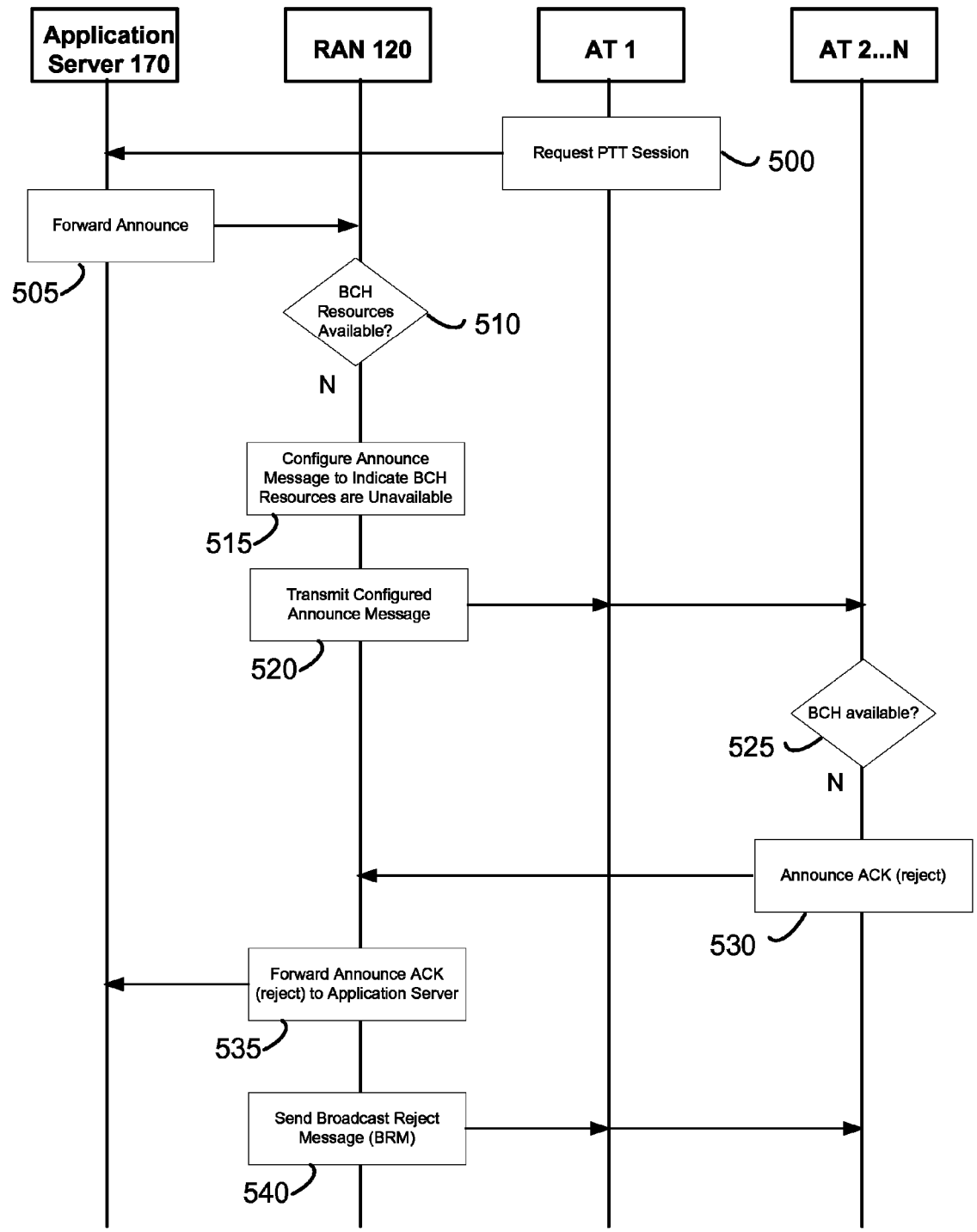
FIG. 5 illustrates a multicast messaging process according to an embodiment of the present invention.

FIG. 5 illustrates a multicast messaging process according to an embodiment of the present invention. In 500, one of a plurality of access terminals ("AT 1") in communication with the RAN 120 ("PTT initiator") requests to initiate a PTT session, or multicast session. Accordingly, the PTT initiator sends a PTT call request to the application server 170 (e.g., a PTT server). Next, in 505, the application server 170 forwards an announce message to the RAN 120.

In 510, the RAN 120 determines whether sufficient BCH resources are available to support the PTT session within each sector of the wireless communication system 100. As will be appreciated, the level of load on the downlink BCH can vary from sector to sector because each sector can be carrying different multicast sessions at different times (e.g., based on where interested multicast group members are located). For example, the RAN 120 may compare the current load on the downlink BCH, within each sector, with a threshold load value. If the current load is greater than the threshold load value, the RAN 120 determines sufficient BCH resources to be unavailable for that sector. Otherwise, if the current load is not greater than the threshold load value, the RAN 120 determines sufficient BCH resources to be available for that sector.

While not shown explicitly within FIG. 5, implicit within the determining of step 510 is a recognition, at the RAN 120, that the announce message forwarded in 505 is associated with the downlink BCH. Conventionally, this association is not known at the RAN 120, which simply acts as a conduit for transmission of the announce message from the application server 170 to the ATs 1 . . . N. In other words, the announce message is an application-layer message, and the RAN 120 conventionally does not analyze the content of messaging transferred via the RAN 120 at the application level. However, in the process of FIG. 5, the RAN 120 is configured to perform the determining of 510 responsive to announce messages for PTT or multicast sessions, and as such includes functionality to recognize announce messages.

For convenience of description, assume that the RAN 120 determines, at 510, that sufficient BCH resources are unavailable for at least one sector. In 515, the RAN 120 configures the announce message to include an indication, for target ATs within the at least one sector, that sufficient BCH resources are not available to support the PTT session in that sector(s). It will be appreciated that the announce message is not simply dropped after the RAN 120 determines the PTT session cannot be supported in one or more sectors because the application server 170 would interpret the drop as unintentional (i.e., the application server 170 would have no way of knowing that the RAN 120 determined to drop the announce message), and may resend the announce message again and again until one or more announce ACKs are received at the application server 170.

The configuring of 515 may be performed in a number of ways, which will now be described in greater detail with respect to a number of illustrative examples.

In a first example, the RAN 120 can transmit the announce message including and/or along with an access control message (ACM). As used herein, if an announce message is sent along with an ACM, the combination of the announce message and ACM may collectively be referred to as the announce message, in an example. The ACM controls how ATs receiving the announce message and interested in registering for the announced PTT session can access the reverse link channel in order to respond/register for the announced PTT session. ACMs are discussed in greater detail within U.S. Provisional Patent Application No. 60/974,796, entitled "METHODS OF RESPONDING TO AN INTERACTIVE MULTICAST MESSAGE WITHIN A WIRELESS COMMUNICATION SYSTEM", filed on Sep. 24, 2007, assigned to the assignee hereof and expressly incorporated by reference herein in its entirety.

As discussed in the above-incorporated co-pending U.S. Provisional Patent Application, ACMs can include (i) a listing of UATIs for designating an order in which the listed access terminals can access the reverse link traffic channel to respond to the announce message, (ii) an APersistence value or a number from which each access terminal can calculate an APersistence value for a probabilistic response procedure or (iii) both (i) and (ii).

Accordingly, if the ACM is configured to include both (i) the listing of UATIs and (ii) the APersistence value, the format of ACM can be as follows:

TABLE 1

| | ATI Type | First AT | Second AT | Remaining AT(s) |
|---|---|---|---|---|
| ACM Example 1 | MATI: ["01"] | UATI1: ["AT 2"] | UATI2: ["AT 3"] | APersistence | wherein the ATI type field indicates that the ACM is a multicast message, the first listed AT UATI1 ("AT 2") is the AT that is reserved the first slot or time period in which to respond to the announce message and the second listed AT UATI2 ("AT 3") is the AT that is reserved the second slot or time period in which to respond to the announce message (e.g., such that the responses of AT 2 and AT 3 do not collide or interfere with each other on the reverse link). The remaining ATs, or non-listed ATs, wait until after each of the listed ATs has attempted to respond and then transmit via a probabilistic process based on the APersistence value. Again, ACMs such as those illustrated in Table 1 have been described in more detail in the above-incorporated U.S. Provisional Patent Application.

In an embodiment of the present invention, the ACM can be expanded so as to include a Resource Availability (RA) field within the ACM. In an example, the RA field is a single bit field that indicates whether the announced PTT session can be supported by the RAN 120 within a particular sector. Thus, for example, if the RA field is set to a first logic level (e.g., a higher logic level or logic "1"), the RA field indicates that sufficient BCH resources are available to support the PTT session in that sector. Otherwise, if the RA field is set to a second logic level (e.g., a lower logic level or logic "0"), the RA field indicates that sufficient resources are not available to support the PTT session in that sector. Table 2 (below) illustrates an ACM configured to include (i) the listing of UATIs, (ii) the APersistence value, and the RA field:

TABLE 2

| | ATI Type | First AT | Second AT | Remaining AT(s) | RA Field |
|---|---|---|---|---|---|
| ACM Example 2 - (BCH Available) | MATI: ["01"] | UATI1: ["AT 2"] | UATI2: ["AT 3"] | APersistence | RA = "1" |
| ACM Example 3 - (BCH Unavailable) | MATI: ["01"] | UATI1: ["AT 2"] | UATI2: ["AT 3"] | APersistence | RA = "0" |

Thus, in this example, as shown in Table 2 in ACM Example 3, the RAN 120 determines that sufficient BCH resources are not available to support the PTT session in 510, and the configuring of 515 sets the RA field to the second logic level (RA="0") so as to indicate the BCH resource status to ATs 1 . . . N. It will be appreciated that using the RA field of the ACM to indicate the BCH resource status need not be used in conjunction with a multicast DOS message embodiment, but rather can be appended or included along with any announce message format.

In a second example, assume the RAN 120 packages the announce message received from the application server 170 into a data over signaling (DOS) message upon receiving the announce message in 505. DOS messages are well-known in the art within EV-DO protocols. DOS messages are defined by EV-DO standards as a unicast message addressed to a unicast access terminal identifier (UATI) that identifies a single intended access terminal recipient, and are not associated with multicast messaging in the EV-DO standard. However, the announce message can be addressed to the multicast access terminal identifier (MATI) and can be transmitted on a downlink control channel to ATs 1 . . . N, with ATs 1 . . . N each being configured to recognize that a DOS message addressed to the MATI, or a "multicast DOS message", is intended to be interpreted as a multicast message (i.e., an announce message). The conversion of an announce message into a multicast DOS message is discussed in greater detail in U.S. Provisional Patent Application No. 60/974,833, entitled "MULTICAST MESSAGING WITHIN A WIRELESS COMMUNICATION SYSTEM", filed on Sep. 24, 2007, assigned to the assignee hereof, and expressly incorporated by reference herein in its entirety.

Conventional unicast DOS messages, or DOS messages addressed to the UATI with a singled intended AT recipient, include a 1-bit Acknowledgment Required ("ACK_REQ") field. Thus, if the ACK_REQ field is set to a first logic level (e.g., a higher logic level or logic "1"), a given AT is prompted to transmit an acknowledgment to the unicast DOS message, and if the ACK_REQ field is set to a second logic level (e.g., a lower logic level or logic "0"), the given AT is not prompted to transmit the acknowledgment. Within the context of multicast DOS messages, acknowledgment messages are not logical in the sense that the number of AT recipients of the multicast DOS message can be relatively high, and acknowledgments sent by ATs in response to a multicast DOS message would interfere with each other and clog the reverse link channel.

Accordingly, because an ACK_REQ=1 condition is not likely to actually be used to trigger acknowledgments responsive to multicast DOS messages, a system designer can configure each of ATs 1 . . . N to interpret a multicast DOS message having an ACK_REQ field set to the first logic level (i.e., ACK_REQ=1) as an indicator that BCH resources for the PTT session announced by the multicast DOS message are unavailable. Thus, in this example, if the RAN 120 determines that sufficient BCH resources are not available to support the PTT session in 510, the configuring of 515 may set the ACK_REQ field to the first logic level so as to indicate the BCH resource status to ATs 1 . . . N.

In a third example, the RAN 120 can transmit the announce message including and/or along with a BRM if the BCH resources are not available. In this example, if the announce message is not sent included within and/or along with a BRM, ATs interpret the announce message as indicating that sufficient BCH resources are available to handle the announced PTT session. As used herein, if an announce message is sent along with an BRM, the combination of the announce message and BRM may collectively be referred to as the announce message, in an example.

Returning to FIG. 5, after configuring the announce message in 515, the RAN 120 transmits the configured announce message (e.g., including an ACM having an RA field set to a given logic level, packaged as a multicast DOS message, etc.) in 520, within sectors that have been determined not to have sufficient BCH resources, 510, to announce the PTT session to each of ATs 1 . . . N. While not illustrated in FIG. 5, a conventional announce message, or an announce message not configured to indicate BCH resource unavailability, can be transmitted in sectors that have sufficient BCH resources to support the PTT session as determined in 510.

Each of ATs 1 . . . N receive the configured announce message and determine whether the configured announce message indicates that sufficient BCH resources are not available in 525. For example, in 525, each of ATs 1 . . . N check the status or logic level of the RA field included in the ACM that is appended to the announce message to determine whether the configured announce message indicates that sufficient BCH resources are not available. In another example, in 525, each of ATs 1 . . . N check the status or logic level of the ACK_REQ field of the multicast DOS message to determine whether the configured announce message indicates that sufficient BCH resources are not available. In yet another example, in 525, each of ATs 1 . . . N may check the status or logic levels of both the RA field of the ACM and the ACK_REQ field of the multicast DOS message to determine whether the configured announce message indicates that sufficient BCH resources are not available. Thus, the logic level of a field (e.g., the RA field of the ACM, the ACK_REQ field of the multicast DOS message, etc.) set at the RAN 120 can be used to signal or convey a BCH resource status to ATs receiving the announce message. Accordingly, it will be appreciated that embodiments of the present invention need not be limited to conveying the BCH resource status information with ACMs and/or multicast DOS messages, but rather any type of message format or field may be used to convey this information.

For convenience of explanation, assume that a given AT ("AT 2") determines, in 525, that sufficient BCH resources are not available to support the announced PTT session in AT 2's current sector. In 530, AT 2 sends an announce ACK to the RAN 120 to indicate a rejection of the announced PTT session. Conventionally, the announce ACK "reject" message is sent by ATs that are not interested in joining or participating in an announced PTT session. However, because AT 2 determines that insufficient BCH resources are available to support the announced PTT session, 525, AT 2 sends the announce ACK rejection irrespective of whether AT 2 is interested in the announced PTT session, 530. It will be appreciated that steps 525 and 530 of FIG. 5 can concurrently be performed at any number of ATs among ATs 2 . . . N.

In 535, the RAN 120 receives the announce ACK reject message from AT 2 and forwards the announce ACK reject message to the application server 170. Thus, the application server 170 does not grant the floor to AT 1 because the received announce ACK message is rejecting, and not accepting, the announced PTT session. Accordingly, the condition of "falsely" granting AT 1 the floor is avoided.

In 540, the RAN 120 transmits a broadcast reject message (BRM) in each sector that is determined, in 510, to lack sufficient BCH resources to support the announced PTT session. The BRM instructs ATs to ignore the announced PTT session such that no announce ACK message (e.g., neither an announce ACK "accept" message nor an announce ACK "reject" message) need be sent. For a further discussion of announce ACK message suppression methodologies, see U.S. Provisional Patent Application No. 60/974,831, entitled "METHODS OF MANAGING ACKNOWLEDGMENT TRANSMISSIONS FROM MULTICAST GROUP MEMBERS OF A MULTICAST GROUP WITHIN A WIRELESS COMMUNICATIONS NETWORK", filed on Sep. 24, 2007, assigned to the assignee hereof, and expressly incorporated by reference herein in its entirety.

As will be appreciated by one of ordinary skill in the art, by determining, at the RAN 120, whether sufficient BCH resources are available to support an announced PTT session and indicating, to ATs, the BCH resource status information along with the announce message, the number of false grants can be reduced. The BCH resource status can be conveyed from the RAN 120 to one or more ATs in any number of ways, including but not limited to an RA field within an ACM included along with the announce message, an ACK_REQ field of the announce message if the announce message is converted into a multicast DOS message and transmitted on the downlink control channel, a BRM sent along with the announce message, and/or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, aspects of embodiments of the invention can include logical implementations of the functions described herein. For example, embodiments of the invention can further include logic configured to perform the steps, sequence of actions, processes and/or algorithms disclosed herein. Accordingly, those skilled in the art will appreciate that embodiments of the invention are not limited to the examples provided herein.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer-readable medium including code stored thereon for performing the steps, functions, algorithms and/or sequence of actions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of granting a floor to an access terminal initiating a multicast session within a wireless communication system operating in accordance with a wireless communication protocol, comprising:
   receiving an announce message to be transmitted to a plurality of access terminals, the received announce message configured to announce a given multicast session;
   determining whether sufficient resources are available to support the given multicast session;
   configuring the received announce message to convey whether sufficient resources are available to support the given multicast session based on the determining step; and
   transmitting the configured announce message to the plurality of access terminals.

2. The method of claim 1, wherein the determining step determines whether sufficient resources are available by comparing a level of load on a downlink channel that is to carry media for the given multicast session with a load threshold.

3. The method of claim 2, wherein the determining step determines sufficient resources are available if the comparison indicates the level of load on the downlink channel is less than the load threshold, and the determining step determines sufficient resources are not available if the comparison indicates the level of load on the downlink channel is not less than the load threshold.

4. The method of claim 1, wherein the determining step determines whether sufficient resources are available, in each of a plurality of sectors of the wireless communication system, to carry the given multicast session on a downlink broadcast channel (BCH).

5. The method of claim 4, wherein the determining step determines whether sufficient resources are available by comparing a level of load on the downlink BCH in each of the plurality of sectors with a load threshold.

6. The method of claim 5, wherein the determining step determines sufficient resources are available on a per-sector basis such that if the comparison indicates the level of load on the downlink BCH for a given sector is less than the load threshold, then sufficient resources are available, and if the comparison indicates the level of load on the downlink BCH for the given sector is not less than the load threshold, then sufficient resources are not available.

7. The method of claim 1, further comprising:
   recognizing, at an access network, the received announce message to be an application-layer message that announces a multicast communication on a downlink broadcast channel (BCH),
   wherein the determining step is performed at the access network in response to the recognition.

8. The method of claim 1, wherein the configuring step includes:
   generating an access control message (ACM) that includes instructions with regard to how the plurality of access terminals are to transmit response to the announce message;
   configuring the ACM to include a resource availability indicator that conveys whether the determining step determines sufficient resources are available to support the given multicast session; and
   wherein the transmitting step transmits the ACM along with the announce message such that the combination of the ACM and the announce message correspond to the configured announce message.

9. The method of claim 8, wherein the resource availability indicator corresponds to a single-bit resource availability (RA) field of the ACM.

10. The method of claim 8, wherein the resource availability indicator is customized to reflect resource availability for a particular sector that transmits the combination of the ACM and the announce message.

11. The method of claim 1, wherein the configuring step includes:
 formatting the received announce message as a data over signaling (DOS) message configured for multicast transmission to the plurality of access terminals; and
 configuring the DOS announce message to include a resource availability indicator that conveys whether the determining step determines sufficient resources are available to support the given multicast session,
 wherein the DOS announce message corresponds to the configured announce message.

12. The method of claim 11, wherein the resource availability indicator corresponds to a single-bit acknowledgment required (ACK_REQ) field of the DOS announce message.

13. The method of claim 11, wherein the resource availability indicator is customized to reflect resource availability for a particular sector that transmits the DOS announce message.

14. The method of claim 1, wherein the determining step determines that sufficient resources are not available,
 wherein the configuring step includes generating a broadcast reject message (BRM), and
 wherein the transmitting step transmits the combination of the announce message and the BRM as the configured announce message, the inclusion of the BRM with the announce message indicating, to the plurality of access terminals, that sufficient resources are not available to support the given multicast session.

15. The method of claim 1, wherein the determining step determines that sufficient resources are available,
 wherein the configuring step does not include generating a broadcast reject message (BRM), and
 wherein the transmitting step transmits the announce message without the BRM as the configured announce message, the absence of the BRM indicating, to the plurality of access terminals, that sufficient resources are available to support the given multicast session.

16. The method of claim 1, further comprising:
 receiving, in response to the transmitted configured announce message, an announce acknowledgment (ACK) message from one of the plurality of access terminals, the announce ACK message configured to indicate a rejection of the announced multicast session;
 forwarding the announce ACK message to an application server from which the receiving step received the announce message; and
 transmitting a broadcast reject message (BRM) to the plurality of access terminals after the announce ACK message is received.

17. The method of claim 16, wherein the BRM is transmitted only within sectors that the determining step determines to lack sufficient resources for the given multicast session.

18. A method of granting a floor to an access terminal initiating a multicast session within a wireless communication system operating in accordance with a wireless communication protocol, comprising:
 receiving an announce message announcing a given multicast session;
 determining whether the received announce message indicates whether sufficient resources are available to support the given multicast session; and
 sending an announce acknowledgment (ACK) message that indicates an acceptance or rejection of the given multicast session, in response to the received announce message, based on the determining step.

19. The method of claim 18,
 wherein the receiving step receives an access control message (ACM) with the announce message that includes instructions with regard to how the plurality of access terminals are to transmit a response to the announce message, the ACM including a resource availability indicator that conveys whether sufficient resources are available to support the given multicast session, and
 wherein the determining step evaluates the resource availability indicator to determine whether sufficient resources are available to support the given multicast session.

20. The method of claim 19, wherein the resource availability indicator corresponds to a single-bit resource availability (RA) field of the ACM.

21. The method of claim 19, wherein the sending step sends the announce ACK message in accordance with the instructions included within the ACM.

22. The method of claim 18,
 wherein the receiving step receives the announce message as a data over signaling (DOS) message, the DOS announce message including a resource availability indicator that conveys whether sufficient resources are available to support the given multicast session,
 wherein the determining step evaluates the resource availability indicator to determine whether sufficient resources are available to support the given multicast session.

23. The method of claim 22, wherein the resource availability indicator corresponds to a single-bit acknowledgment required (ACK_REQ) field of the DOS announce message.

24. The method of claim 18,
 wherein the receiving step receives a broadcast reject message (BRM) with the announce message,
 wherein the determining step determines that sufficient resources are not available to support the given multicast session based on the BRM, and
 wherein the sending step sends the announce acknowledgment (ACK) message that indicates a rejection of the given multicast session.

25. The method of claim 18, wherein the determining step determines that sufficient resources are not available,
 wherein the receiving step does not receive a broadcast reject message (BRM) with the announce message,
 wherein the determining step determines that sufficient resources are available to support the given multicast session based on the absence of the BRM, and
 wherein the sending step sends the announce acknowledgment (ACK) message that indicates an acceptance of the given multicast session.

26. The method of claim 18, further comprising, if the announce ACK message indicates a rejection of the given multicast session,
 receiving a broadcast reject message (BRM) after the sending step.

27. An access network within a wireless communication system operating in accordance with a wireless communication protocol, comprising:

means for receiving an announce message to be transmitted to a plurality of access terminals, the received announce message configured to announce a given multicast session;

means for determining whether sufficient resources are available to support the given multicast session;

means for configuring the received announce message to convey whether sufficient resources are available to support the given multicast session based on the determination of the means for determining; and means for transmitting the configured received announce message to the plurality of access terminals.

28. The access network of claim 27, wherein the means for configuring includes:

means for generating an access control message (ACM) that includes instructions with regard to how the plurality of access terminals are to transmit response to the announce message;

means for configuring the ACM to include a resource availability indicator that conveys whether the means for determining determines sufficient resources are available to support the given multicast session; and wherein the means for transmitting transmits the ACM along with the announce message such that the combination of the ACM and the announce message correspond to the configured received announce message.

29. The access network of claim 27, wherein the means for configuring includes:

means for formatting the received announce message as a data over signaling (DOS) message configured for multicast transmission to the plurality of access terminals; and means for configuring the DOS announce message to include a resource availability indicator that conveys whether the means for determining determines sufficient resources are available to support the given multicast session, wherein the DOS announce message corresponds to the configured announce message.

30. The access network of claim 27, wherein the means for determining determines that sufficient resources are not available, wherein the means for configuring generates a broadcast reject message (BRM), and wherein the means for transmitting transmits the combination of the announce message and the BRM as the configured announce message, the inclusion of the BRM with the announce message indicating, to the plurality of access terminals, that sufficient resources are not available to support the given multicast session.

31. The access network of claim 27, wherein the means for determining determines that sufficient resources are available, wherein the means for configuring does not generate a broadcast reject message (BRM), and wherein the means for transmitting transmits the announce message without the BRM as the configured announce message, the absence of the BRM indicating, to the plurality of access terminals, that sufficient resources are available to support the given multicast session.

32. The access network of claim 27, further comprising:

means for receiving, in response to the transmitted configured announce message, an announce acknowledgment (ACK) message from one of the plurality of access terminals, the announce ACK message configured to indicate a rejection of the announced multicast session;

means for forwarding the announce ACK message to an application server from which the means for receiving received the announce message; and means for transmitting a broadcast reject message (BRM) to the plurality of access terminals after the announce ACK message is received.

33. An access terminal within a wireless communication system operating in accordance with a wireless communication protocol, comprising:

means for receiving an announce message announcing a given multicast session;

means for determining whether the received announce message indicates whether sufficient resources are available to support the given multicast session; and means for sending an announce acknowledgment (ACK) message that indicates an acceptance or rejection of the given multicast session, in response to the received announce message, based on the determination of the means for determining.

34. The access terminal of claim 33, wherein the means for receiving receives an access control message (ACM) with the announce message that includes instructions with regard to how a plurality of access terminals are to transmit a response to the announce message, the ACM including a resource availability indicator that conveys whether sufficient resources are available to support the given multicast session, and wherein the means for determining evaluates the resource availability indicator to determine whether sufficient resources are available to support the given multicast session.

35. The access terminal of claim 33, wherein the means for receiving receives the announce message as a data over signaling (DOS) message, the DOS announce message including a resource availability indicator that conveys whether sufficient resources are available to support the given multicast session, wherein the means for determining evaluates the resource availability indicator to determine whether sufficient resources are available to support the given multicast session.

36. The access terminal of claim 33, wherein the means for receiving receives a broadcast reject message (BRM) with the announce message, wherein the means for determining determines that sufficient resources are not available to support the given multicast session based on the BRM, and wherein the means for sending sends the announce acknowledgment (ACK) message that indicates a rejection of the given multicast session.

37. The access terminal of claim 33, wherein the means for determining determines that sufficient resources are not available, wherein the means for receiving does not receive a broadcast reject message (BRM) with the announce message, wherein the means for determining determines that sufficient resources are available to support the given multicast session based on the absence of the BRM, and wherein the means for sending sends the announce acknowledgment (ACK) message that indicates an acceptance of the given multicast session.

38. An access network within a wireless communication system operating in accordance with a wireless communication protocol, comprising:

logic configured to receive an announce message to be transmitted to a plurality of access terminals, the received announce message configured to announce a given multicast session;

logic configured to determine whether sufficient resources are available to support the given multicast session;

logic configured to configure the received announce message to convey whether sufficient resources are available to support the given multicast session based on the determination of the logic configured to determine; and logic configured to transmit the configured announce message to the plurality of access terminals.

39. The access network of claim 38, wherein the logic configured to configure includes:

logic configured to generate an access control message (ACM) that includes instructions with regard to how the plurality of access terminals are to transmit response to the announce message;

logic configured to configure the ACM to include a resource availability indicator that conveys whether the logic configured to determine determines sufficient resources are available to support the given multicast session; and wherein the logic configured to transmit transmits the ACM along with the announce message such that the combination of the ACM and the announce message correspond to the configured announce message.

40. The access network of claim 38, wherein the logic configured to configure includes:

logic configured to format the received announce message as a data over signaling (DOS) message configured for multicast transmission to the plurality of access terminals; and logic configured to configure the DOS announce message to include a resource availability indicator that conveys whether the logic configured to determine determines sufficient resources are available to support the given multicast session, wherein the DOS announce message corresponds to the configured announce message.

41. The access network of claim 38, wherein the logic configured to determine determines that sufficient resources are not available, wherein the logic configured to configure generates a broadcast reject message (BRM), and wherein the logic configured to transmit transmits the combination of the announce message and the BRM as the configured announce message, the inclusion of the BRM with the announce message indicating, to the plurality of access terminals, that sufficient resources are not available to support the given multicast session.

42. The access network of claim 38, wherein the logic configured to determine determines that sufficient resources are available, wherein the logic configured to configure does not generate a broadcast reject message (BRM), and wherein the logic configured to transmit transmits the announce message without the BRM as the configured announce message, the absence of the BRM indicating, to the plurality of access terminals, that sufficient resources are available to support the given multicast session.

43. The access network of claim 38, further comprising:

logic configured to receive, in response to the transmitted configured announce message, an announce acknowledgment (ACK) message from one of the plurality of access terminals, the announce ACK message configured to indicate a rejection of the announced given multicast session;

logic configured to forward the announce ACK message to an application server from which the logic configured to receive received the announce message; and logic configured to transmit a broadcast reject message (BRM) to the plurality of access terminals after the announce ACK message is received.

44. An access terminal within a wireless communication system operating in accordance with a wireless communication protocol, comprising:

logic configured to receive an announce message announcing a given multicast session;

logic configured to determine whether the received announce message indicates whether sufficient resources are available to support the given multicast session; and logic configured to send an announce acknowledgment (ACK) message that indicates an acceptance or rejection of the given multicast session, in response to the received announce message, based on the determination of the logic configured to determine.

45. The access terminal of claim 44, wherein the logic configured to receive receives an access control message (ACM) with the announce message that includes instructions with regard to how a plurality of access terminals are to transmit a response to the announce message, the ACM including a resource availability indicator that conveys whether sufficient resources are available to support the given multicast session, and wherein the logic configured to determine evaluates the resource availability indicator to determine whether sufficient resources are available to support the given multicast session.

46. The access terminal of claim 44, wherein the logic configured to receive receives the announce message as a data over signaling (DOS) message, the DOS announce message including a resource availability indicator that conveys whether sufficient resources are available to support the given multicast session, wherein the logic configured to determine evaluates the resource availability indicator to determine whether sufficient resources are available to support the given multicast session.

47. The access terminal of claim 44, wherein the logic configured to receive receives a broadcast reject message (BRM) with the announce message, wherein the logic configured to determine determines that sufficient resources are not available to support the given multicast session based on the BRM, and wherein the logic configured to send sends the announce acknowledgment (ACK) message that indicates a rejection of the given multicast session.

48. The access terminal of claim 44, wherein the logic configured to determine determines that sufficient resources are not available, wherein the logic configured to receive does not receive a broadcast reject message (BRM) with the announce message, wherein the logic configured to determine determines that sufficient resources are available to support the given multicast session based on the absence of the BRM, and wherein the logic configured to send sends the announce acknowledgment (ACK) message that indicates an acceptance of the given multicast session.

49. A non-transitory computer-readable medium including program code stored thereon, the program code configured to operate within an access network of a wireless communication system operating in accordance with a wireless communication protocol, comprising:
   program code to receive an announce message to be transmitted to a plurality of access terminals, the received announce message configured to announce a given multicast session;
   program code to determine whether sufficient resources are available to support the given multicast session;
   program code to configure the received announce message to convey whether sufficient resources are available to support the given multicast session based on the determination of the program code to determine; and
   program code to transmit the configured announce message to the plurality of access terminals.

50. The non-transitory computer-readable medium of claim 49, wherein the program code to configure includes:
   program code to generate an access control message (ACM) that includes instructions with regard to how the plurality of access terminals are to transmit response to the announce message;
   program code to configure the ACM to include a resource availability indicator that conveys whether the program code to determine determines sufficient resources are available to support the given multicast session; and
   wherein the program code to transmit transmits the ACM along with the announce message such that the combination of the ACM and the announce message correspond to the configured announce message.

51. The non-transitory computer-readable medium of claim 49, wherein the program code to configure includes:
   program code to format the received announce message as a data over signaling (DOS) message configured for multicast transmission to the plurality of access terminals; and
   program code to configure the DOS announce message to include a resource availability indicator that conveys whether the program code to determine determines sufficient resources are available to support the given multicast session,
   wherein the DOS announce message corresponds to the configured announce message.

52. The non-transitory computer-readable medium of claim 49, wherein the program code to determine determines that sufficient resources are not available,
   wherein the program code to configure generates a broadcast reject message (BRM), and
   wherein the program code to transmit transmits the combination of the announce message and the BRM as the configured announce message, the inclusion of the BRM with the announce message indicating, to the plurality of access terminals, that sufficient resources are not available to support the given multicast session.

53. The non-transitory computer-readable medium of claim 49, wherein the program code to determine determines that sufficient resources are available,
   wherein the program code to configure does not generate a broadcast reject message (BRM), and
   wherein the program code to transmit transmits the announce message without the BRM as the configured announce message, the absence of the BRM indicating, to the plurality of access terminals, that sufficient resources are available to support the given multicast session.

54. The non-transitory computer-readable medium of claim 49, further comprising:
   program code to receive, in response to the transmitted configured announce message, an announce acknowledgment (ACK) message from one of the plurality of access terminals, the announce ACK message configured to indicate a rejection of the announced given multicast session;
   program code to forward the announce ACK message to an application server from which the program code to receive the received announce message; and
   program code to transmit a broadcast reject message (BRM) to the plurality of access terminals after the announce ACK message is received.

55. A non-transitory computer-readable medium including program code stored thereon, the program code configured to operate within an access terminal of a wireless communication system operating in accordance with a wireless communication protocol, comprising:
   program code to receive an announce message announcing a given multicast session;
   program code to determine whether the received announce message indicates whether sufficient resources are available to support the given multicast session; and
   program code to send an announce acknowledgment (ACK) message that indicates an acceptance or rejection of the given multicast session, in response to the received announce message, based on the determination of the program code to determine.

56. The non-transitory computer-readable medium of claim 55,
   wherein the program code to receive receives an access control message (ACM) with the announce message that includes instructions with regard to how the plurality of access terminals are to transmit a response to the announce message, the ACM including a resource availability indicator that conveys whether sufficient resources are available to support the given multicast session, and
   wherein the program code to determine evaluates the resource availability indicator to determine whether sufficient resources are available to support the given multicast session.

57. The non-transitory computer-readable medium of claim 55,
   wherein the program code to receive receives the announce message as a data over signaling (DOS) message, the DOS announce message including a resource availability indicator that conveys whether sufficient resources are available to support the given multicast session,
   wherein the program code to determine evaluates the resource availability indicator to determine whether sufficient resources are available to support the given multicast session.

58. The non-transitory computer-readable medium of claim 55,
   wherein the program code to receive receives a broadcast reject message (BRM) with the announce message,
   wherein the program code to determine determines that sufficient resources are not available to support the given multicast session based on the BRM, and
   wherein the program code to send sends the announce acknowledgment (ACK) message that indicates a rejection of the given multicast session.

59. The non-transitory computer-readable medium of claim 55, wherein the program code to determine determines that sufficient resources are not available,
- wherein the program code to receive does not receive a broadcast reject message (BRM) with the announce message,
- wherein the program code to determine determines that sufficient resources are available to support the given multicast session based on the absence of the BRM, and
- wherein the program code to send sends the announce acknowledgment (ACK) message that indicates an acceptance of the given multicast session.

* * * * *